March 25, 1930.   E. O. ENGELS   1,752,159
WALL CONSTRUCTION FOR BAKE OVENS AND THE LIKE
Filed Oct. 29, 1928
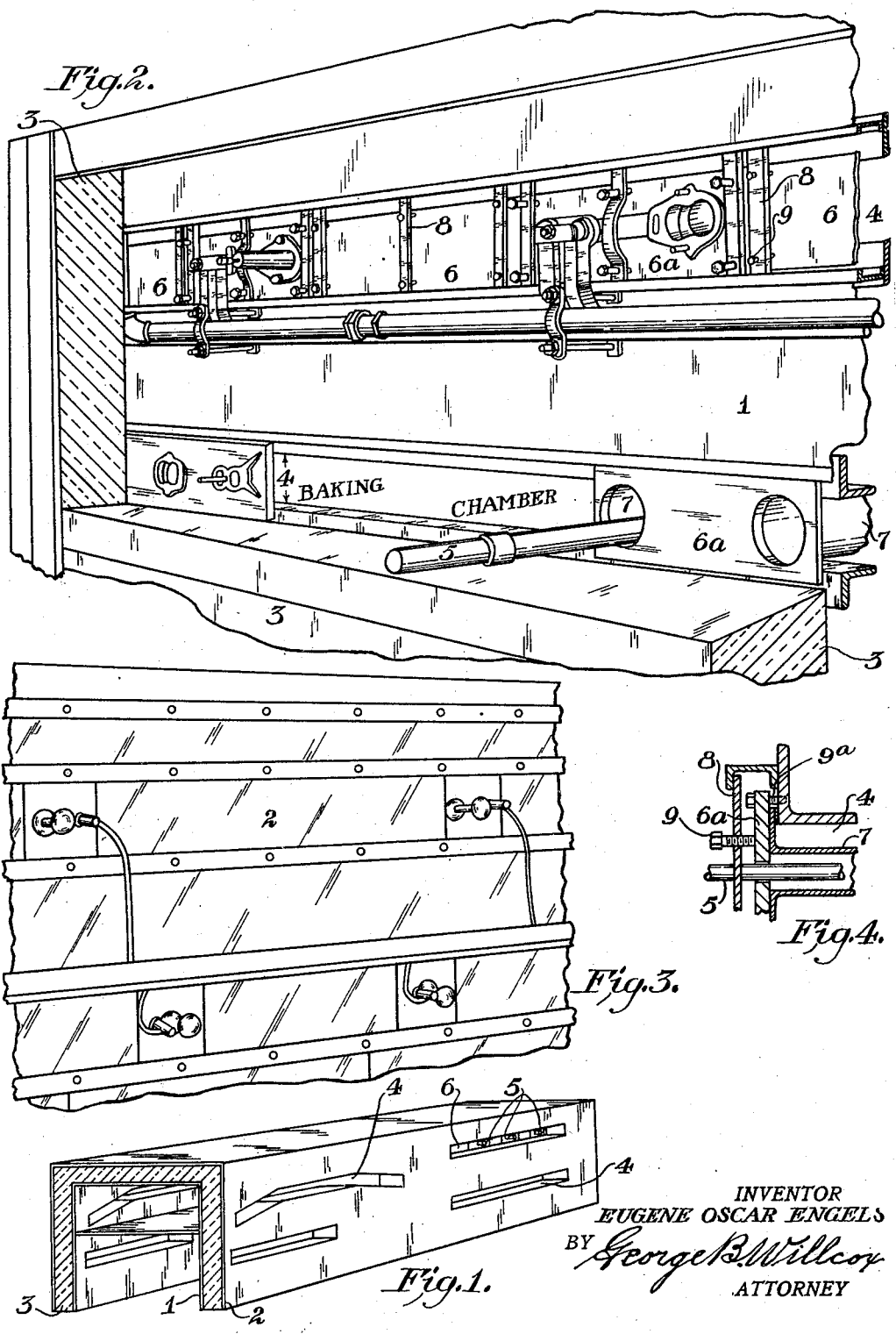
INVENTOR
EUGENE OSCAR ENGELS
BY George B. Willcox
ATTORNEY Patented Mar. 25, 1930

1,752,159

UNITED STATES PATENT OFFICE

EUGENE OSCAR ENGELS, OF SAGINAW, MICHIGAN, ASSIGNOR TO BAKER-PERKINS COMPANY, INC., OF SAGINAW, MICHIGAN, A CORPORATION OF NEW YORK

WALL CONSTRUCTION FOR BAKE OVENS AND THE LIKE

Application filed October 29, 1928. Serial No. 315,643.

This invention pertains to a bake oven having a heated baking chamber surrounded by an outer wall of brickwork, or by a wall consisting of an enveloping layer of heat insulating material enclosed in an outer box-like shell which is supported by a suitable framework.

My improvement is adapted to be used in peel ovens, plate ovens and other structures of similar nature wherein the heating elements are introduced into a baking chamber through apertures in the oven walls, and arranged in groups, rows or zones.

An object of the invention is to provide means whereby the burners or heating elements can be easily and quickly changed as regards their number, spacing and arrangement or grouping.

Another object is to facilitate changing from one type of heating element to another, say from gas burners to electric heating units, or otherwise.

The attainment of these objects results in imparting to a bake oven a new facility for making such rearrangements of its heating units as will enable a single oven to produce many different kinds of baked goods, and to make the changes without tearing down the oven structure or dismantling its conveying and other mechanisms.

Bake ovens usually have differently heated zones for steaming, drying, browning, etc. and these zones may be located one above the other or horizontally one after the other, and they may be straight or humped. Every oven, however, requires for its most effective operation a definite distribution of its heating elements.

Heretofore it has been customary to determine before-hand, while planning the oven, just what shall be the location of each individual heating element. Accordingly the heating elements were installed at the prescribed places by projecting them through holes cut in the side walls of the oven. Frequently an obstruction in the building, such as a post or wall, would make it necessary to cut new holes through the oven walls for re-inserting the burners, a very costly and time-consuming task. Obviously, after such an oven had been put into service, any error of judgment in locating the burners could be rectified only by making new holes through the wall of the baking chamber and through the outer wall of the oven and through the insulating material between the two walls, in order to permit the burners to be shifted to their proper position, and afterwards the walls had to be repaired by patching. This work had to be done whether the change of location was merely a small matter of a few inches, or a change of several feet.

Sometimes it even becomes desirable to change the overall length of an oven after it has been put into use. Heretofore a change in length necessitated tearing down the oven in order to make such rearrangements of its burners or heating elements as was imposed by the new length.

My improvement enables all such major and minor changes in burner locations, for whatever reason, to be made cheaply and expeditiously, so that it becomes almost a mere matter of choice with the baker as to whether he shall alter the length of his oven, rearrange the heating zones, or otherwise shift the burners in order to do a different kind of baking. His choice can be put into effect without undue expense or delay in the operation of the plant.

The invention also enables an oven that is equipped at the outset with gas burners of the open flame type, or with burners of the enclosed tubular type, or with electric heating units, to be changed to any other type. The change from one kind of heating element to another can be made easily and quickly without cutting holes through the walls of the oven or otherwise interfering with its original construction.

The improvement furthermore provides a ready means for adapting the oven to changed baking requirements from time to time by increasing or decreasing the number of heating elements, thereby imparting to the oven extreme flexibility for variety baking.

With the foregoing and certain other objects in view, which will appear later in the specification, my invention comprises the devices described and claimed and the equivalents thereof.

In the drawings Fig. 1 is a diagrammatic view of a tunnel type oven in perspective, showing a variety of slots in the oven walls, corresponding to various baking zones.

Fig. 2 is a fragmentary view of an oven wall embodying my invention, the outer panel being removed from part of the area shown, also part of the inner baking chamber wall plates being removed to show the slot.

Fig. 3 is a fragmentary face view of the outer wall as it appears when completed.

Fig. 4 is a part sectional detail, showing the manner in which a gas burner is mounted in the oven wall.

For purpose of illustration I shall show and describe the oven as formed with a thick wall consisting of inner and outer plates 1, 2 with heat insulating material 3 between them. The inner plates 1 comprise the side wall of the baking chamber and the outer plates or panels 2 comprise the outer wall of the oven.

The essential feature of my invention is an elongated slot 4 formed in the wall. In the type of wall shown the slot 4 extends through the sheet metal wall 1 of the baking chamber, through the insulating material 3 and through the outer oven wall 2.

The heating elements 5, of whatever kind, are inserted in spaced relation into the baking chamber through this slot, as indicated in Fig. 1. The slot allows any or all of them to be shifted sidewise to adjust their spaced relations as conditions may require, and means is provided to fasten them in any desired location along the length of the slot 4. After the heating elements are in place the cover plates 6, 6ª for the slot of the baking chamber wall are cut to appropriate lengths and attached to complete the closure of that part of the baking chamber wall between the heating elements. The space between one burner and the next and between the baking chamber and the outer oven wall 2 is filled with insulating material 3, and lastly the outside wall panels are attached. Access to the interior of the baking chamber may be had anywhere along the length of the slot 4 by merely removing the appropriate panel or outer wall 2, taking away the intervening section of the insulating wall 3 and then removing the corresponding plate 6 or 6ª on the baking chamber wall.

In the embodiment of the improvement selected for purposes of description the burner 5 is shown as being received in an outer tubular jacket 7 that communicates with a hole in a burner panel 6ª. This arrangement, illustrated in Figs. 2 and 4, is the so-called indirect heat arrangement of the burner. Any other arrangement of the burners with respect to the slot 4 in the oven wall, or with respect to the removable panels 6ª may be employed without departing from my invention as set forth in certain of the claims.

The means for removably clamping the burner panels 6ª and the intermediate panels 6 in place over the slot 4 in the baking chamber wall is, preferably, to provide removable stay-bars 8 and thrust bolts 9 thereon for pressing the panels 6, 6ª against the marginal edges that define the slots 4, as shown in Fig. 2. Cap bolts 9ª, threaded into the angle above slot 4 may also be employed if desired.

The claimed invention in its broader aspects is not confined to this specific method of fastening the panels to the margins of the wall around the slot.

Having thus described my invention, what I claim and desire to secure by Letters Patent is:

1. A bake oven including a baking chamber whose side wall is formed with a slot, cover plates having openings, heating elements registering with said openings and projecting in spaced relation through said slot and into said baking chamber, said elements with their respective plates adapted for independent adjustment of said spaced relation in the direction of the length of said slot, independently removable closure panels for said slot between said cover plates, and fastening means for securing said plates and panels to said side wall.

2. A bake oven whose side wall is formed with a slot therethrough, heating elements projecting in spaced relation through said slot and into the oven, said elements shiftable sidewise in the slot and in the direction of its length, closure panels for said slot and fastening means removably securing said panels to said wall.

3. A bake oven having a wall formed with a slot therethrough, heating elements received in the slot and projecting in spaced relation into the oven and mounted in a mode admitting of altering their spaced relation in the direction of the length of the slot, and closures for said slot apertured to receive said heating elements and removably secured to said wall.

4. A bake oven having a side wall formed with a slot therethrough, a heating element received in the slot and projecting into the oven and mounted in a mode admitting of altering its location in the slot in the direction of length of the slot, and closures for said slot removably secured to said wall.

In testimony whereof, I affix my signature.

EUGENE OSCAR ENGELS.